April 17, 1962 R. W. SPRINGMEIER 3,029,464
BASTING DEVICE
Filed Jan. 15, 1960

ROBERT W. SPRINGMEIER
INVENTOR

United States Patent Office 3,029,464
Patented Apr. 17, 1962

3,029,464
BASTING DEVICE
Robert W. Springmeier, 26 Queen Anne Drive,
Hazelwood, Mo.
Filed Jan. 15, 1960, Ser. No. 2,703
1 Claim. (Cl. 15—541)

This invention relates to basting devices, and has particular application to devices for basting foods cooked over an open fire, but its utility is not confined thereto.

It has been common since time immemorial to baste meats prepared on an open fire, with liquid condiments, oil, and the like. Ordinarily, such basting is accomplished with a brush or mop-like device, which is dipped frequently into an open container for the liquid.

This method has been inconvenient, requiring space for the container for the liquid, and leading to spillage and dripping from container and brush, as well as to the introduction of undesirable foreign matter into the liquid.

One of the objects of this invention is to provide a device whereby basting liquid can be applied to food, being barbecued or roasted, directly from a covered container to which foreign matter has no access.

Another object is to provide such a device in which the basting fluid is applied by a brush of novel design.

Still other objects will become apparent to those skilled in the art in the light of the following description and accompanying drawing.

In accordance with this invention, generally stated, a basting device is provided in which basting fluid is contained in a flexible container, preferably wide-mouthed when open, and is dispensed from the container through a tube of sufficient length to provide protection from an open fire or from the heat of an oven, as the case may be, and a brush so designed as to permit effective application of the basting liquid to the food, and at the same time to permit adequate cleaning of the brush after use.

In the drawing,

FIGURE 5 is a sectional view taken along the line 5—5 of FIGURE 4.

Figure 1:
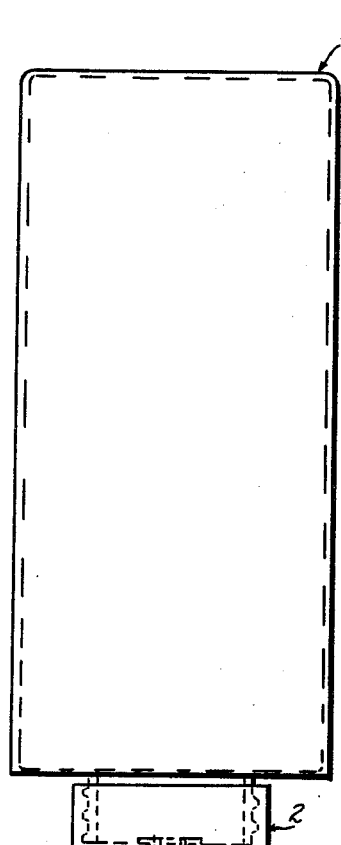
FIGURE 1 is a view in side elevation of a basting device constructed in accordance with one illustrative embodiment of this invention.
Figure 2:
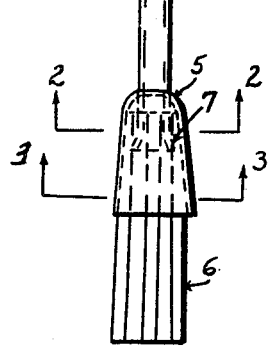
FIGURE 2 is a sectional view taken along the line 2—2 of FIGURE 1.
Figure 2:
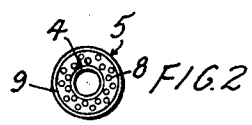
Figure 3:
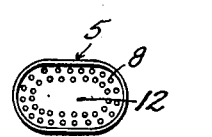
FIGURE 3 is a sectional view taken along the line 3—3 of FIGURE 1.

Referring now to the drawing, and particularly to FIGURES 1 through 3, for one illustrative embodiment of the invention, reference numeral 1 indicates a flexible container which may be made of a non-toxic plastic such as polyethylene, although the material of which it is made forms no part of this invention. The container 1 is covered by a cap 2, preferably made of a rigid plastic, or metal, screw-threadedly, removably mounted on the neck of the container.

Projecting outwardly through and from the cap 2, through a boss 3, is a hollow, open-ended tube 4, preferably made of aluminum, stainless steel, or the like. The tube 4 can be made of any suitable material, so long as it is rigid, heat-resistant, non-toxic, and capable of easy cleaning. It is preferably at least eight inches long.

The tube 4 is securely mounted in an opening in the cap 2 and boss 3 by a swaging operation, making a solid, liquid-tight connection between the outside of the tube and the cap.

At the other, outer end of the tube 4, in this embodiment, a cup-shaped ferrule 5, preferably oval in top plan view, as indicated in FIGURE 3, is slidably mounted on the tube, and is prevented from sliding from the free end of the tube by an outward flare or bell of the tube, indicated at 7.

A brush 6, is made up, in this embodiment, of fiber bristles 8, imbedded in a split plastic ring 9 surrounding the tube 4. The bristles may be secured around the tube in any desired manner, but the manner illustrated has a number of advantages. As is shown in FIGURES 2 and 3, the cross-sectional configuration of the cup 5 varies from oval at its outer, open end, to circular at its lower end. The length of the minor axis, i.e. the distance between the sides of the cup 5, at the section adjacent the bell 7 when the cup is in position, is made only slightly greater than the outside diameter of the extreme outer end of the tube, so that a close fit is obtained between the cup, bristles, and tube, which provide sufficient frictional engagement to maintain the cup and bristles in position during use, and which tends to give the proper shaping of the bristles at their free end, to assure proper feed or flow of the liquid into and through the brush.

Figure 4:
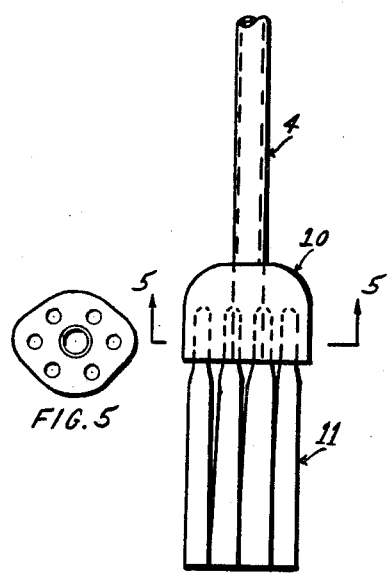
FIGURE 4 is a fragmentary view in side elevation of another embodiment of brush.

In the embodiment of brush shown in FIGURE 4, a brush head 10 is made of a heat-resistant plastic, shrunk on or otherwise securely fastened to the outer end of the tube 4. The head 10 is oval in section, and bristles 11 are set in the head, in an oval pattern, around the open end of the hollow tube 4.

It will be observed in both embodiments that the bristles surrounding the tube end define a chamber 12, and that the chamber is defined by only the upper part of the bristles, the lower part being removed from the open mouth of the tube. The bristles preferably project about two inches, and extend at least ¾" along a major axis and ⅜" along the minor axis, forming a chamber the dimensions of which are about ⅛ x ½ x 1".

In manufacturing the device of this invention shown in FIGURES 1–3, the tube 4 is swaged into the cap 2, the cup 5 is slipped over the free end of the tube with its mouth directed away from the cap, and the free end of the tube is flared outwardly to produce the bell 7. The bristles 8, imbedded at one end in the split ring 9, are put into place around the tube at the flared end, and the cup is pushed up tight to mount the bristles securely between the cup and the bell 7.

A cheaper but not quite so satisfactory variation of this embodiment, involves the use of bristles which are tied or otherwise permanently fastened around the tube, before the cup 5 is pushed into place. In this embodiment, the cup can be round in cross-section from its base to its free end, originally, and can be compressed to the oval shape after it is in position around the bristles. If the compression is accomplished with jaws which act on the cup beyond the flared end of the tube 4, the cup can be made unretractable along the tube, by making the distance between the side walls of the cup less than the diameter of the flared end of the tube. The open end of the cup, except for a passage forming a continuation of the passage in the tube 4, can be filled with a plastic material to seal in the bristles and render the brush more easily cleaned.

In the case of the brush of the embodiment shown in FIGURE 4, the plastic head is preferably heated, the tube is inserted, and the plastic is then permitted to cool and shrink around, and bond to, the tube.

It is to be noted that there are no valves in the device. The reasons are twofold: First, a valve would make the device difficult to clean; second, a valve which admitted air to the container would prevent the sucking back of the liquid when, after pressure had been put on the outside walls of the container to dispense the liquid, the pressure was released.

In operation, the cap 2 is removed from the container 1, and the container is filled with the desired basting liquid. The cap is then replaced and tightened. When it is desired to dispense the liquid, the brush is put in the proper position relative to the food, and the flexible container squeezed, forcing the liquid through the tube and into the chamber 12 defined by the bristles. It will be seen that the chamber 12 is necessarily somewhat elongated, and this arrangement gives excellent distribution of the liquid through the bristles. It is also to be observed that the lower ends of the bristles are protected from contact with the liquid, so that only the upper, flexible parts of the bristles are coated with liquid.

When the pressure on the wall of the container is released, the walls, because of their resilience, move outwardly, thus sucking the liquid back from the chamber 12 and through the tube 4, to the container. In this manner, there is little, if any, dripping.

Having thus described the invention, what is claimed and desired to be secured by Letters Patent is:

A basting device comprising a flexible container having a flat bottom and an externally threaded neck, a rigid, internally threaded cap removably threadedly mounted on the neck of said container, a hollow, open-ended rigid tube fixedly mounted in the cap, said tube having an uninterrupted passage communicating with the interior of and extending outwardly from said container, a brush on the outer end of said tube, said brush being formed of bristles mounted outside said tube with their lower ends removed from the open mouth of said tube and their upper ends projecting outwardly beyond said open mouth of said tube, and a cup slidably but permanently mounted on said tube, the cup opening toward the mouth of the tube, the said mouth of the tube being flared radially outwardly to spread the said bristles, to form a frictional engagement between the bristles and the cup and to trap the said cup between the mouth of the tube and the cap, said tube being of substantially uniform inside and outside diameter between the said cap and the said flared portion of said mouth, the internal diameter of said tube through its entire length being at least as great as its internal diameter between the cap and the flaring portion of the mouth.

References Cited in the file of this patent

UNITED STATES PATENTS

| | | |
|---|---|---|
| 399,308 | Wright | Mar. 12, 1889 |
| 681,148 | Stow | Aug. 20, 1901 |
| 2,308,674 | Cave | Jan. 19, 1943 |
| 2,482,384 | Tullgren et al. | Sept. 20, 1949 |

FOREIGN PATENTS

| | | |
|---|---|---|
| 16,831 | Great Britain | 1890 |
| 599,500 | Germany | July 3, 1934 |